US012621737B2

(12) United States Patent
Jia et al.

(10) Patent No.: US 12,621,737 B2
(45) Date of Patent: May 5, 2026

(54) NON-TERRESTRIAL NETWORK CONNECTION MANAGEMENT

(71) Applicant: AT&T Intellectual Property I, L.P., Atlanta, GA (US)

(72) Inventors: Yupeng Jia, Austin, TX (US); Hongyan Lei, Plano, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 843 days.

(21) Appl. No.: 18/045,560

(22) Filed: Oct. 11, 2022

(65) Prior Publication Data

US 2024/0121692 A1 Apr. 11, 2024

(51) Int. Cl.
*H04W 36/00* (2009.01)
*H04W 36/32* (2009.01)
*H04W 52/02* (2009.01)
*H04W 84/06* (2009.01)

(52) U.S. Cl.
CPC ..... *H04W 36/322* (2023.05); *H04W 36/0016* (2013.01); *H04W 52/0235* (2013.01); *H04W 84/06* (2013.01)

(58) Field of Classification Search
CPC .......... H04W 52/0229; H04W 52/0235; H04B 11/00; G06F 3/167; G06F 9/4418; Y02D 30/70; G10L 15/22; G10L 15/02; G10L 2015/223
See application file for complete search history.

(56) References Cited

U.S. PATENT DOCUMENTS

| | | | | |
|---|---|---|---|---|
| 2016/0062949 A1* | 3/2016 | Smith | ................... | H04W 4/029 |
| | | | | 702/150 |
| 2022/0210711 A1* | 6/2022 | Fan | ....................... | H04W 48/18 |
| 2023/0047987 A1* | 2/2023 | Tseng | ................... | H04W 36/08 |
| 2025/0211326 A1* | 6/2025 | Atungsiri | ........... | H04B 7/18545 |

* cited by examiner

*Primary Examiner* — Jay P Patel
*Assistant Examiner* — Shehab A Alawdi
(74) *Attorney, Agent, or Firm* — Guntin & Gust, PLC; Miyoung Shin

(57) ABSTRACT

The described technology is generally directed towards non-terrestrial network connection management. Mobile device transitions between terrestrial and non-terrestrial network connections can be streamlined by predicting transitions in advance and by advance mobile device acquisition of network transition data. Terrestrial and non-terrestrial network functions can provide prediction data and network transition data to mobile devices. Furthermore, techniques are provided to manage mobile device searches for terrestrial network connections while a mobile device has an active non-terrestrial network connection.

20 Claims, 11 Drawing Sheets

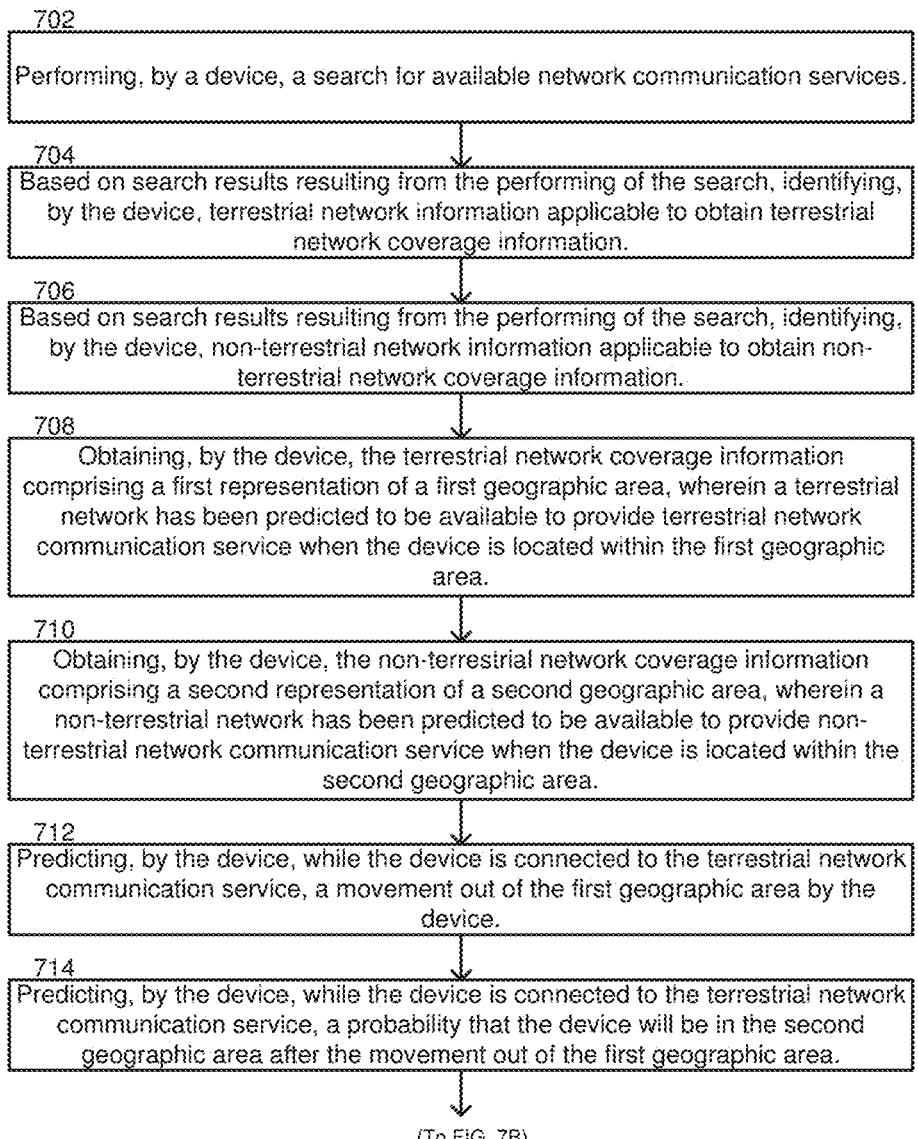

702

Performing, by a device, a search for available network communication services.

704

Based on search results resulting from the performing of the search, identifying, by the device, terrestrial network information applicable to obtain terrestrial network coverage information.

706

Based on search results resulting from the performing of the search, identifying, by the device, non-terrestrial network information applicable to obtain non-terrestrial network coverage information.

708

Obtaining, by the device, the terrestrial network coverage information comprising a first representation of a first geographic area, wherein a terrestrial network has been predicted to be available to provide terrestrial network communication service when the device is located within the first geographic area.

710

Obtaining, by the device, the non-terrestrial network coverage information comprising a second representation of a second geographic area, wherein a non-terrestrial network has been predicted to be available to provide non-terrestrial network communication service when the device is located within the second geographic area.

712

Predicting, by the device, while the device is connected to the terrestrial network communication service, a movement out of the first geographic area by the device.

714

Predicting, by the device, while the device is connected to the terrestrial network communication service, a probability that the device will be in the second geographic area after the movement out of the first geographic area.

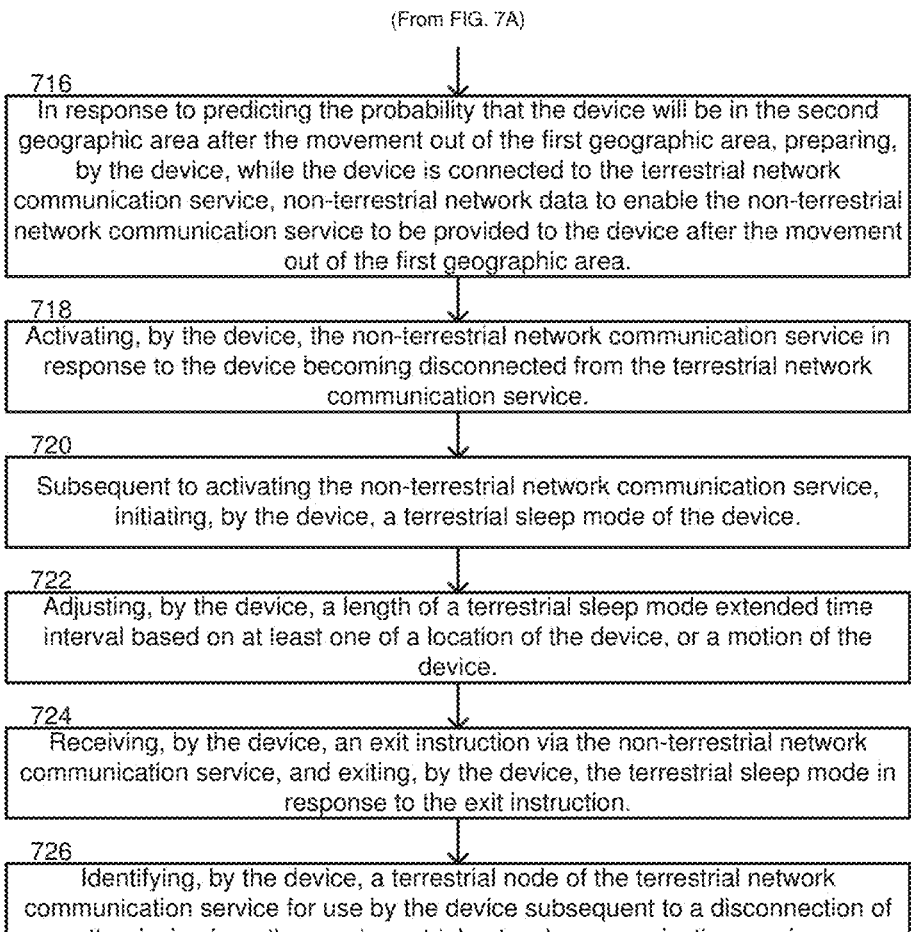

(From FIG. 7A)

716
In response to predicting the probability that the device will be in the second geographic area after the movement out of the first geographic area, preparing, by the device, while the device is connected to the terrestrial network communication service, non-terrestrial network data to enable the non-terrestrial network communication service to be provided to the device after the movement out of the first geographic area.

718
Activating, by the device, the non-terrestrial network communication service in response to the device becoming disconnected from the terrestrial network communication service.

720
Subsequent to activating the non-terrestrial network communication service, initiating, by the device, a terrestrial sleep mode of the device.

722
Adjusting, by the device, a length of a terrestrial sleep mode extended time interval based on at least one of a location of the device, or a motion of the device.

724
Receiving, by the device, an exit instruction via the non-terrestrial network communication service, and exiting, by the device, the terrestrial sleep mode in response to the exit instruction.

726
Identifying, by the device, a terrestrial node of the terrestrial network communication service for use by the device subsequent to a disconnection of the device from the non-terrestrial network communication service.

FIG. 7B

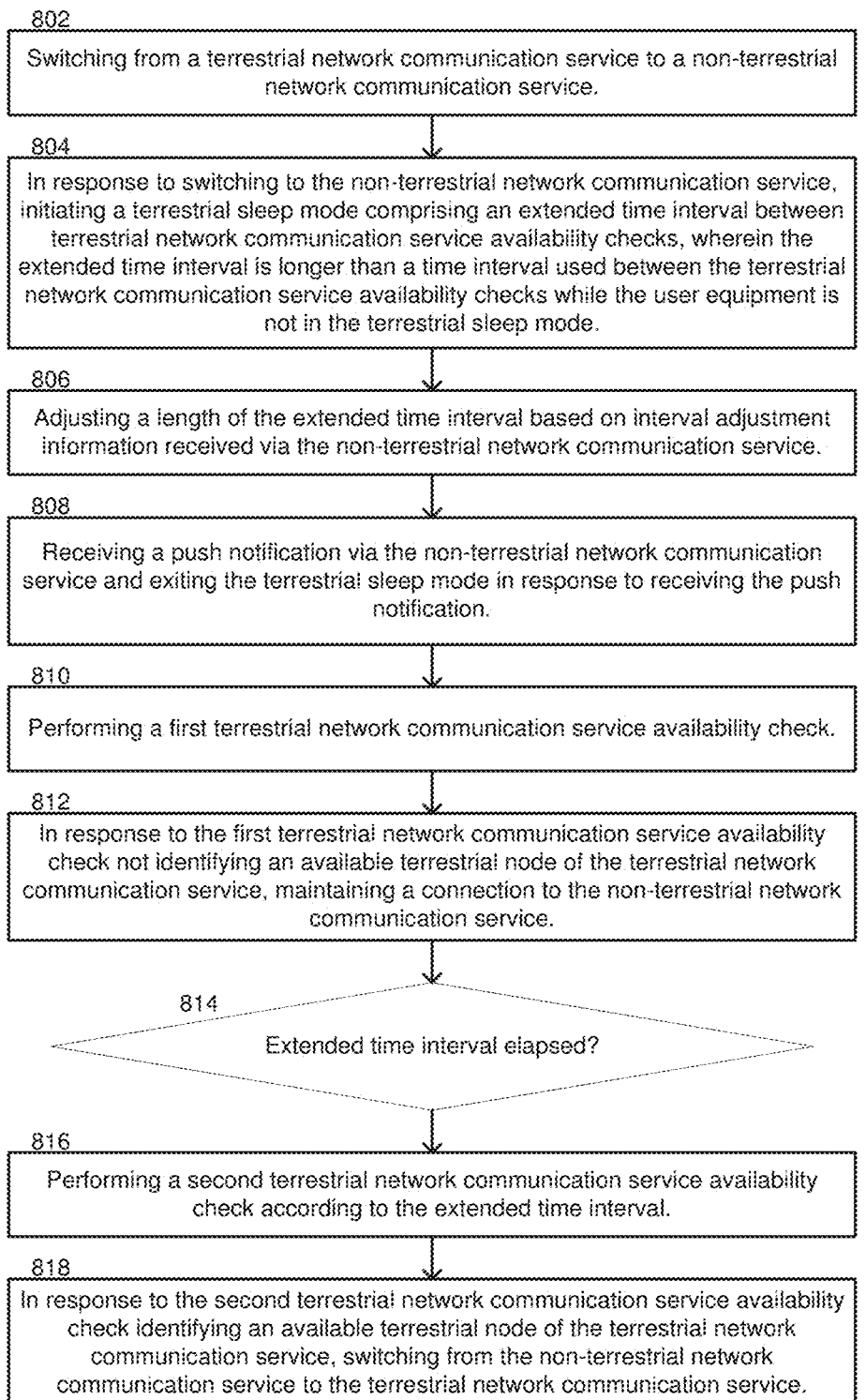

802
Switching from a terrestrial network communication service to a non-terrestrial network communication service.

804
In response to switching to the non-terrestrial network communication service, initiating a terrestrial sleep mode comprising an extended time interval between terrestrial network communication service availability checks, wherein the extended time interval is longer than a time interval used between the terrestrial network communication service availability checks while the user equipment is not in the terrestrial sleep mode.

806
Adjusting a length of the extended time interval based on interval adjustment information received via the non-terrestrial network communication service.

808
Receiving a push notification via the non-terrestrial network communication service and exiting the terrestrial sleep mode in response to receiving the push notification.

810
Performing a first terrestrial network communication service availability check.

812
In response to the first terrestrial network communication service availability check not identifying an available terrestrial node of the terrestrial network communication service, maintaining a connection to the non-terrestrial network communication service.

814
Extended time interval elapsed?

816
Performing a second terrestrial network communication service availability check according to the extended time interval.

818
In response to the second terrestrial network communication service availability check identifying an available terrestrial node of the terrestrial network communication service, switching from the non-terrestrial network communication service to the terrestrial network communication service.

FIG. 8

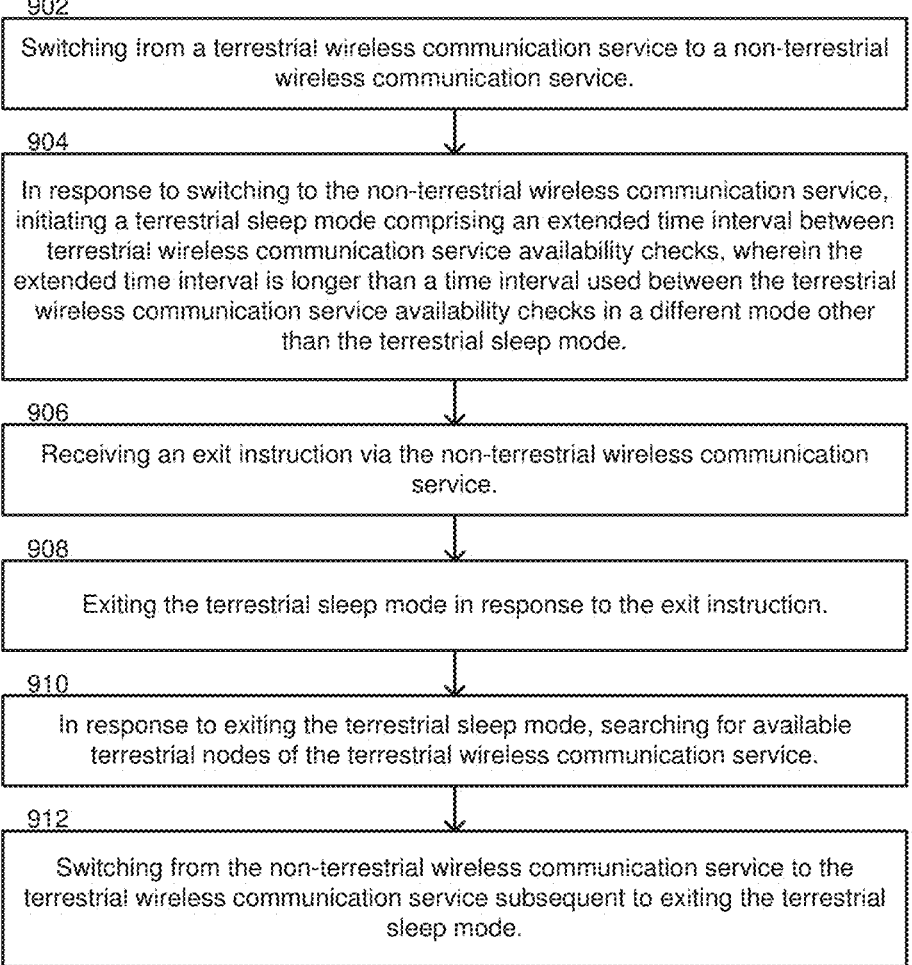

902

Switching from a terrestrial wireless communication service to a non-terrestrial wireless communication service.

904

In response to switching to the non-terrestrial wireless communication service, initiating a terrestrial sleep mode comprising an extended time interval between terrestrial wireless communication service availability checks, wherein the extended time interval is longer than a time interval used between the terrestrial wireless communication service availability checks in a different mode other than the terrestrial sleep mode.

906

Receiving an exit instruction via the non-terrestrial wireless communication service.

908

Exiting the terrestrial sleep mode in response to the exit instruction.

910

In response to exiting the terrestrial sleep mode, searching for available terrestrial nodes of the terrestrial wireless communication service.

912

Switching from the non-terrestrial wireless communication service to the terrestrial wireless communication service subsequent to exiting the terrestrial sleep mode.

FIG. 9

NON-TERRESTRIAL NETWORK CONNECTION MANAGEMENT

TECHNICAL FIELD

The subject application is related to electronic communications, and more particularly, to providing wireless communication service to mobile devices.

BACKGROUND

Satellite communications are rapidly changing and improving. While so-called "satellite dish" antennas have supported satellite communications for decades, satellite communication technology has historically remained too large, cumbersome, and expensive to support direct satellite communication by most mobile "cell phone" type devices. However, there is presently renewed interest and investment in building technologies that will support direct satellite communication by mobile devices.

Direct satellite communication by mobile devices will create opportunities for wireless service providers to improve their service by providing non-terrestrial (satellite) communication service, particularly in remote areas where terrestrial communication service has not been deployed. However, numerous advancements are needed to integrate non-terrestrial and terrestrial communication service.

The above-described background is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIGS. 7A and 7B provide a flow diagram representing example operations to manage non-terrestrial network transitions, in accordance with various aspects and embodiments of the subject disclosure.

FIG. 8 is a flow diagram representing example operations to manage a terrestrial network sleep mode, in accordance with various aspects and embodiments of the subject disclosure.

FIG. 9 is a flow diagram representing further example operations to manage a terrestrial network sleep mode, in accordance with various aspects and embodiments of the subject disclosure.

DETAILED DESCRIPTION

Figure 1:
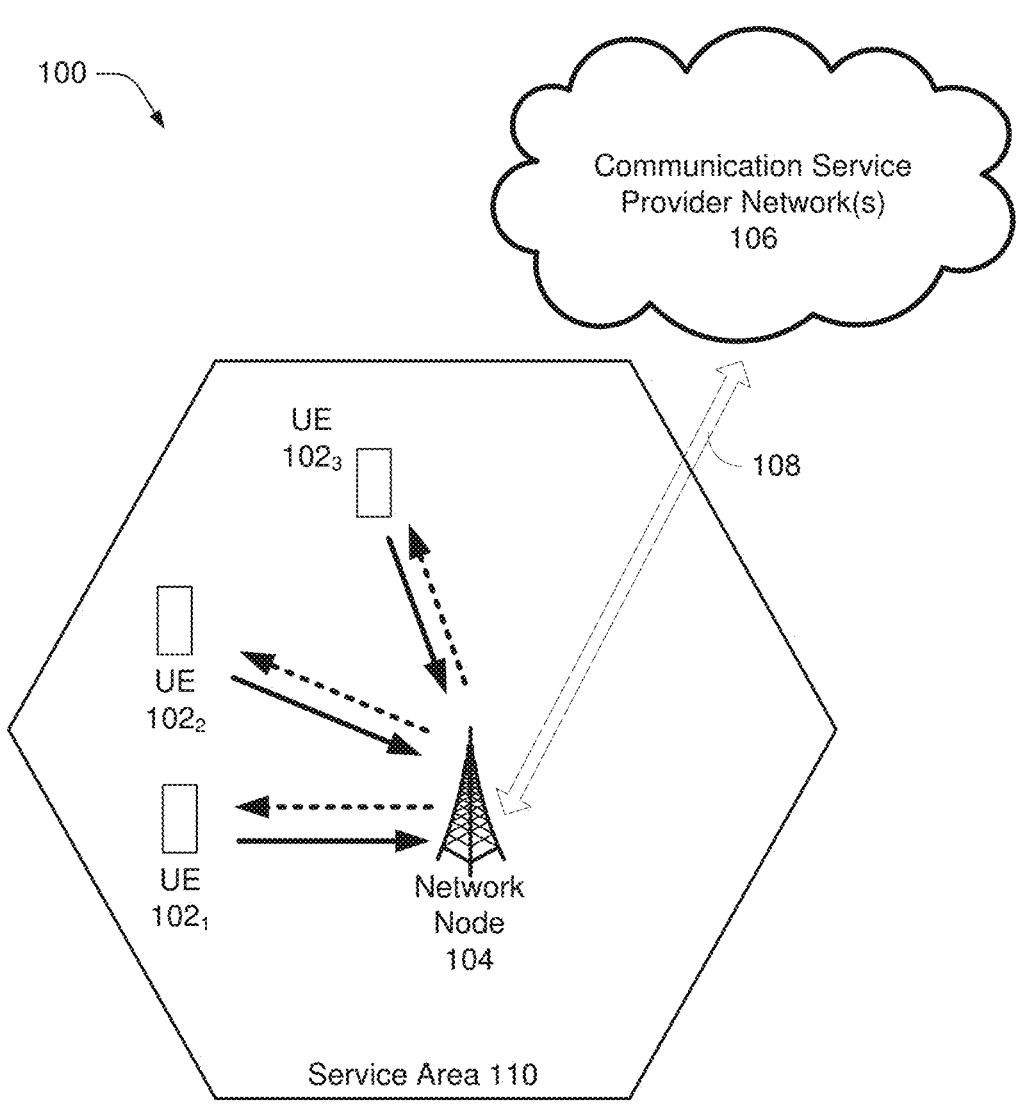
FIG. 1 illustrates an example wireless communication system, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards non-terrestrial network connection management. Mobile device transitions between terrestrial and non-terrestrial network connections can be streamlined by predicting transitions in advance and by advance mobile device acquisition of network transition data. Terrestrial and non-terrestrial network functions can provide prediction data and network transition data to mobile devices. Furthermore, techniques are provided to manage mobile device searches for terrestrial network connections while a mobile device has an active non-terrestrial network connection. Further aspects and embodiments of this disclosure are described in detail below.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments have been described herein in the context of 4G, 5G, or other next generation networks, the disclosed aspects are not limited to a 4G or 5G implementation, and/or other network next generation implementations, as the techniques can also be applied, for example, in third generation (3G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), LTE frequency division duplex (FDD), time division duplex (TDD), 5G, third generation partnership project 2 (3GPP2), ultra mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology. In this regard, all or substantially all aspects disclosed herein can be exploited in legacy telecommunication technologies.

FIG. 1 illustrates a non-limiting example of a wireless communication system 100 which can be used in connection with at least some embodiments of the subject disclosure. In one or more embodiments, system 100 can comprise one or more user equipment UEs 102$_1$, 102$_2$, 102$_3$, referred to collectively as UEs 102, a network node 104 that supports cellular communications in a service area 110, also known as a cell, and communication service provider network(s) 106.

The non-limiting term "user equipment" can refer to any type of device that can communicate with a network node 104 in a cellular or mobile communication system 100. UEs 102 can have one or more antenna panels having vertical and horizontal elements. Examples of UEs 102 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 102 can also comprise IOT devices that communicate wirelessly.

In various embodiments, system 100 comprises communication service provider network(s) 106 serviced by one or more wireless communication network providers. Communication service provider network(s) 106 can comprise a "core network". In example embodiments, UEs 102 can be communicatively coupled to the communication service provider network(s) 106 via network node 104. The network node 104 (e.g., network node device) can communicate with UEs 102, thus providing connectivity between the UEs 102 and the wider cellular network. The UEs 102 can send transmission type recommendation data to the network node 104. The transmission type recommendation data can comprise a recommendation to transmit data via a closed loop multiple input multiple output (MIMO) mode and/or a rank-1 precoder mode.

A network node 104 can have a cabinet and other protected enclosures, computing devices, an antenna mast, and multiple antennas for performing various transmission operations (e.g., MIMO operations) and for directing/steering signal beams. Network node 104 can comprise one or more base station devices which implement features of the network node 104. Network nodes can serve several cells, depending on the configuration and type of antenna. In example embodiments, UEs 102 can send and/or receive communication data via a wireless link to the network node 104. The dashed arrow lines from the network node 104 to the UEs 102 represent downlink (DL) communications to the UEs 102. The solid arrow lines from the UEs 102 to the network node 104 represent uplink (UL) communications.

Communication service provider networks 106 can facilitate providing wireless communication services to UEs 102 via the network node 104 and/or various additional network devices (not shown) included in the one or more communication service provider networks 106. The one or more communication service provider networks 106 can comprise various types of disparate networks, including but not limited to: cellular networks, femto networks, picocell networks, microcell networks, internet protocol (IP) networks Wi-Fi service networks, broadband service network, enterprise networks, cloud-based networks, millimeter wave networks and the like. For example, in at least one implementation, system 100 can be or comprise a large-scale wireless communication network that spans various geographic areas. According to this implementation, the one or more communication service provider networks 106 can be or comprise the wireless communication network and/or various additional devices and components of the wireless communication network (e.g., additional network devices and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also comprise wireless link components, such as but not limited to, line-of-sight (LOS) or non-LOS links which can comprise terrestrial air-interfaces or deep space links (e.g., satellite communication links for navigation). Backhaul links 108 can be implemented via a "transport network" in some embodiments. In another embodiment, network node 104 can be part of an integrated access and backhaul network. This may allow easier deployment of a dense network of self-backhauled 5G cells in a more integrated manner by building upon many of the control and data channels/procedures defined for providing access to UEs.

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000 etc.

For example, system 100 can operate in accordance with any 5G, next generation communication technology, or existing communication technologies, various examples of which are listed supra. In this regard, various features and functionalities of system 100 are applicable where the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

Figure 2:
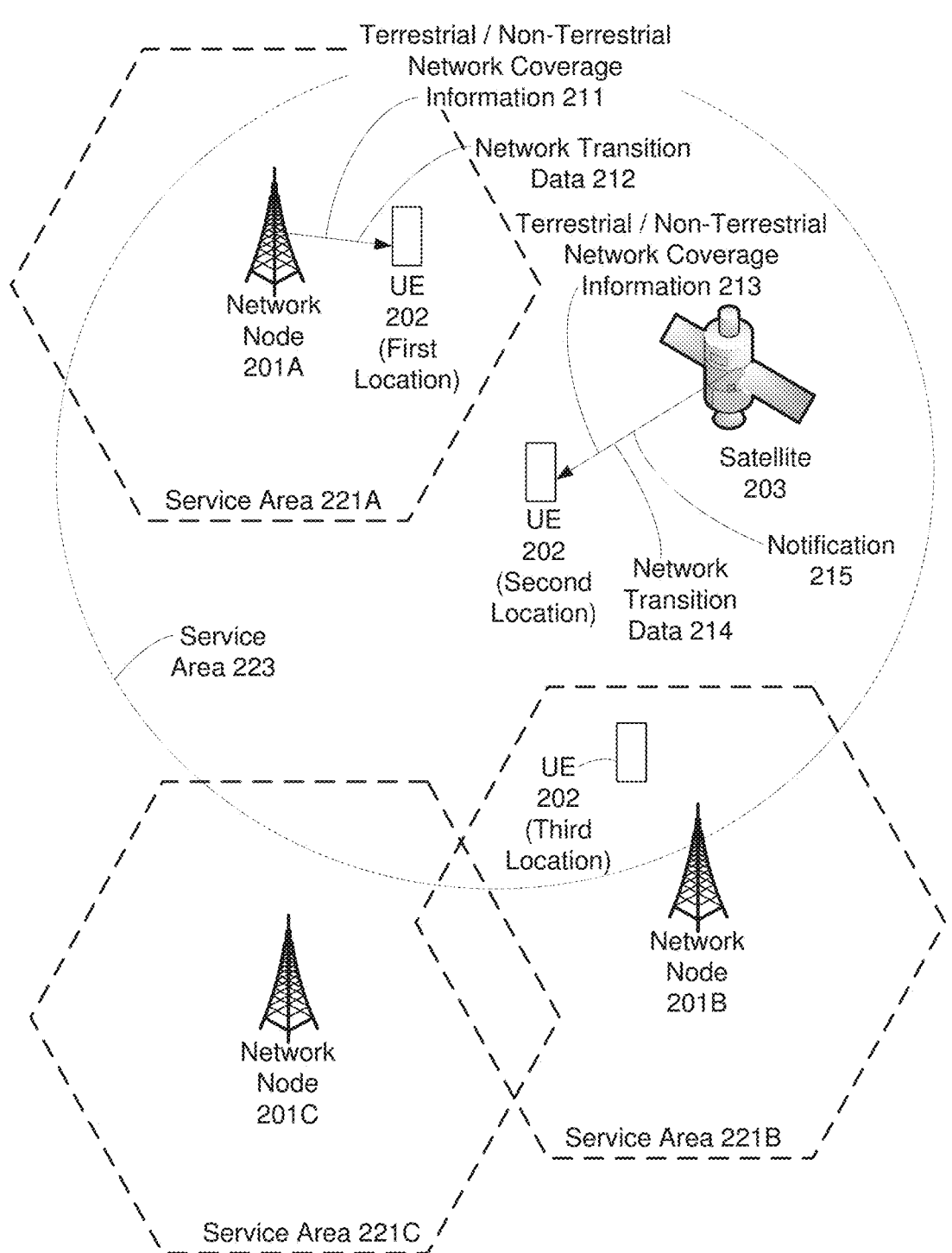
FIG. 2 illustrates travel of a user equipment (UE) from a geographical area served by a terrestrial network into a geographical area served by a non-terrestrial network, and return of the UE to a geographical area served by the terrestrial network, in accordance with various aspects and embodiments of the subject disclosure.

FIG. 2 illustrates travel of a UE from a geographical area served by a terrestrial network into a geographical area served by a non-terrestrial network, and return of the UE to a geographical area served by the terrestrial network, in accordance with various aspects and embodiments of the subject disclosure. FIG. 2 includes terrestrial network nodes 201A, 201B, and 201C, each having a respective service area 221A, 221B, and 221C. FIG. 2 further includes a UE 202 and a satellite 203. The satellite 203 can implement a non-terrestrial network node with a service area 223. In FIG. 2, the terrestrial network nodes 201A, 201B, and 201C can implement, e.g., the network node 104 introduced in FIG. 1, and the UE 202 can implement, e.g., a UE 102 introduced in FIG. 1.

In an example according to FIG. 2, the UE 202 can move from a first location to a second location, and on to a third location, as shown. The first location is within the terrestrial network service area 221A as well as the non-terrestrial network service area 223. The second location is within the non-terrestrial network service area 223 only. The third location is within the terrestrial network service area 221B as well as the non-terrestrial network service area 223. Embodiments of this disclosure can facilitate UE 202 management of transitions from a terrestrial network connection, e.g., while at the first location illustrated in FIG. 2, to a non-terrestrial network connection, e.g., while at the second location illustrated in FIG. 2. Embodiments of this disclosure can furthermore facilitate UE 202 management of transitions from a non-terrestrial network connection, e.g., while at the second illustrated in FIG. 2, to a terrestrial network connection, e.g., while at the third location illustrated in FIG. 2. Additionally, embodiments of this disclosure can facilitate UE 202 management of a terrestrial network sleep mode while the UE 202 is at the second location, thereby reducing impacts of UE 202 attempts to reconnect to the terrestrial network nodes 201A, 201B, 201C while the UE 202 is connected to the non-terrestrial network.

While the UE 202 is at the first location, the UE 202 can be connected to the terrestrial network via network node 201A. A mobility management service at the UE 202 can detect that the UE 202 is nearing the edge of the service area 221A. In response to detecting that the UE 202 is nearing the edge of the service area 221A, the UE 202 can retrieve terrestrial and non-terrestrial network coverage information 211. Terrestrial and non-terrestrial network coverage information 211 can define geographical areas corresponding to nearby service areas 221A and 223. The UE 202 can process the terrestrial and non-terrestrial network coverage information 211 to predict a movement out of the service area 221A and into the service area 223.

In response to the prediction, the UE 202 can retrieve network transition data 212, e.g., data associated with non-terrestrial network coverage provided by the satellite 203. The UE 202 can store the network transition data 212. The UE 202 can use the network transition data 212 to establish a connection to the satellite 203 either before or after the UE 202 disconnects from the network node 201A.

While the UE 202 is at the second location, the UE 202 can initiate a terrestrial network sleep mode, in which the UE 202 uses an extended time interval between terrestrial network communication service availability checks. The extended time interval can be any interval that is longer than a time interval used between the terrestrial network communication service availability checks while the UE 202 is not in the terrestrial sleep mode. In some embodiments, a length of the extended time interval can be based on a location of the UE 202, e.g., a distance of the UE 202 from any of terrestrial network nodes 201A, 201B, 201C, or a motion of the UE 202, e.g., a speed of the UE 202 and/or direction of travel of the UE 202.

In some embodiments, the terrestrial sleep mode can also apply non-decoding availability checks to check availability of the terrestrial network. Non-decoding availability checks can reduce UE 202 power consumption and processing resources by checking for an existence of a waveform without decoding the waveform. For example, the UE 202 can check for existence of waveforms used by the terrestrial network nodes 201A, 201B, 201C, without attempting to decode detected waveforms.

In some embodiments, the terrestrial sleep mode can comprise different sleep levels activated via expirations of different time intervals. For example, after expiration of a first extended time interval, the UE 202 can check for availability of the terrestrial network, and then the UE 202 can re-enter the terrestrial sleep mode for a second extended time interval that is longer than the first extended time interval. The process can be repeated with longer extended time intervals, up to a maximum time interval.

In some embodiments, the non-terrestrial network service provided by satellite 203 can be configured to provide a notification 215 to the UE 202 when the UE 202 is near a terrestrial network node 201B, e.g., when the UE 202 is approaching the service area 221B, or after the UE 202 has entered the service area 221B. The notification 215 can trigger an exit by the UE 202 from the terrestrial sleep mode, so that the UE 202 initiates terrestrial network communication service availability checks.

While the UE 202 is at the second location, the UE 202 can be connected to the non-terrestrial network via satellite 203. The UE 202 can retrieve terrestrial and non-terrestrial network coverage information 213 via the non-terrestrial network. Terrestrial and non-terrestrial network coverage information 213 can define geographical areas corresponding to nearby service areas 221B and 221C. The UE 202 can process the terrestrial and non-terrestrial network coverage information 213 along with UE 202 location and direction of travel information, to predict a movement of the UE 202 into, e.g., the service area 221B.

In response to the predicted movement into the service area 221B, the UE 202 can retrieve network transition data 214, e.g., data associated with terrestrial network coverage provided by network node 201B. The UE 202 can store the network transition data 214. The UE 202 can use the network transition data 214 to establish a connection to the network node 201B either before or after the UE 202 disconnects from the satellite 203.

Figure 3:
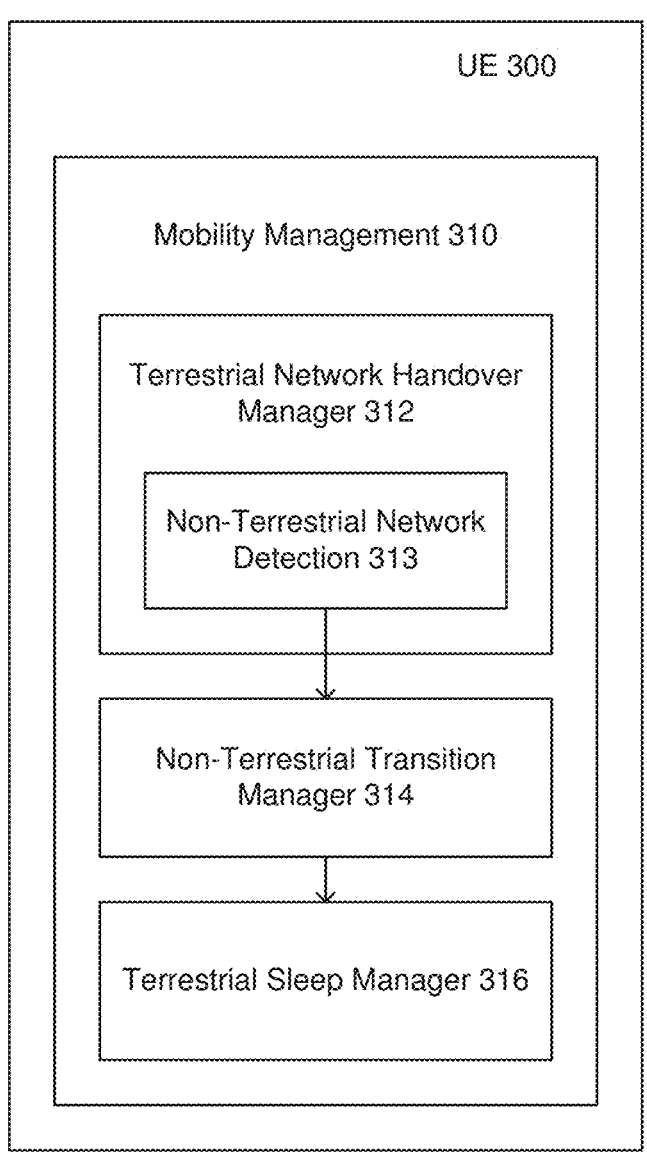
FIG. 3 illustrates an example UE comprising a non-terrestrial transition manager and a terrestrial sleep manager, in accordance with various aspects and embodiments of the subject disclosure.

FIG. 3 illustrates an example UE comprising a non-terrestrial transition manager and a terrestrial sleep manager, in accordance with various aspects and embodiments of the subject disclosure. The example UE 300 includes mobility management 310. Mobility management 310 comprises a terrestrial network handover manager 312 equipped with non-terrestrial network detection 313. Mobility management 310 further comprises non-terrestrial transition manager 314 and terrestrial sleep manager 316.

The UE 300 can implement, e.g., the UE 202 introduced in FIG. 2. Example operations of the UE 300 can include managing transitions between terrestrial and non-terrestrial networks, as illustrated in FIG. 2, as well as initiating, managing, and exiting a terrestrial sleep mode, as discussed in connection with FIG. 2.

In an example, mobility management 310 can comprise mobility management functions presently implemented in UEs, and mobility management 310 can further comprise the additional features illustrated in FIG. 3, namely, non-terrestrial network detection 313, non-terrestrial transition manager 314, and terrestrial sleep manager 316. The non-terrestrial network detection 313 can be configured to retrieve non-terrestrial network coverage information that supplements terrestrial network coverage information retrieved by the terrestrial network handover manager 312.

The non-terrestrial transition manager 314 can be configured to use retrieved terrestrial/non-terrestrial network coverage information, e.g., the terrestrial/non-terrestrial network coverage information 211 and/or 213, to predict UE 300 movements into and out of terrestrial and non-terrestrial service areas 221A, 223, 221B. The non-terrestrial transition manager 314 can be configured to retrieve and store network transition data 212 and/or 214. The non-terrestrial transition manager 314 can be configured to use retrieved transition data 212 and/or 214 to transition the UE 300 between connections to terrestrial and non-terrestrial network nodes such as 201A, 223, and 201B.

While the UE 300 is connected to non-terrestrial network nodes such as 203, the terrestrial sleep manager 316 can manage a terrestrial sleep mode of the UE 300 in which the UE 300 employs extended time intervals between terrestrial network availability checks, as described in connection with FIG. 2. Example configurations of the non-terrestrial transition manager 314 and the terrestrial sleep manager 316 are described further in connection with FIGS. 4 and 5.

In some embodiments, the UE 300 can be configured for automatic identification of terrestrial wireless/wireline connections without user intervention. The UE 300 can perform intelligent detection of wireless/wireline network nodes to prepare for non-terrestrial network connection/disconnection. The UE 300 can optionally use an artificial intelligence (AI) model to predict a need for a non-terrestrial network connection, and the UE 300 can employ the techniques disclosed herein to speed up its connection time to connect to a non-terrestrial network. The UE 300 can support multimodal communications, e.g., communications via Wi-Fi, cellular, satellite, etc. based on the UE's 300 need. The UE 300 can implement an adjustable timer to enable, e.g., multiple sleep modes for multi-mode UE 300 power saving.

A satellite 203 can be complementary to terrestrial networks by addressing coverage challenges and complex use cases that terrestrial infrastructure alone cannot address. Embodiments of this disclosure can make cooperation between terrestrial and non-terrestrial networks smoother/more intelligent and can support service continuity between terrestrial access networks and satellite access networks owned by same or different network operators. Smart terrestrial network and non-terrestrial network transitions can be based on customer needs as well as predictions of terrestrial network coverage and customer mobility.

During a "situation analysis" stage, a multi-mode UE 300 can search for available connections and can formulate a network of networks for the UE 300. The UE 300 can thereby prepare to connect to a non-terrestrial network, e.g., as described in connection with FIG. 2, and the UE 300 can subsequently connect to the non-terrestrial network, e.g., after disconnecting from a terrestrial network.

During a "non-terrestrial network" stage, the UE 300 can perform connection optimization while connected to a non-terrestrial network. The UE 300 can further manage a terrestrial network sleep mode by placing terrestrial radios in sleep mode and periodically waking up cellular/Wi-Fi radios to search for terrestrial cell sites and/or other access points. During its periodic wake ups from sleep mode, the UE 300 can scan terrestrial network bands, e.g., cellular/Wi-Fi bands, without necessarily decoding terrestrial network waveforms.

The UE 300 can furthermore comprise various terrestrial sleep mode control functions. In some embodiments, a multi-stage sleep timer can be used to put a UE 300 radio into different levels of sleep mode. The multi-stage sleep timer can optionally be controlled/adjusted by UE 300 motion, UE 300 geographical position, or via a satellite notification 215 regarding availability of nearby terrestrial network nodes 201B, 201C. In some embodiments, the notification 215 can comprise a push reminder, sent via a satellite 203 radio, which notifies the UE 300 of a nearby cell site or access point, to enable the UE 300 to search/scan for nearby terrestrial network access points.

In some embodiments, the UE 300 can employ an artificial intelligence (AI) model to assist with transitions between terrestrial and non-terrestrial networks. AI predictions can be made by applying the AI model to signal characters and/or UE 300 motion/trajectories. The AI model can be configured to predict a future access point or cell site for the UE 300, based on a UE 300 estimated trajectory. The AI model can furthermore be configured to speed up connections to a non-terrestrial network after leaving terrestrial network coverage, and vice versa.

Embodiments can be adapted to improve user experience by employing non-terrestrial networks to extend terrestrial network coverage into geographic areas where the terrestrial network has a weak or absent existence. Embodiments can employ needs-aware multi-mode (terrestrial and non-terrestrial network) connections, or single mode (terrestrial or non-terrestrial network) connections to avoid unnecessary UE 300 power consumption. A dynamic sleep timer for UE 300 radios (terrestrial or non-terrestrial network radios) can be employed to avoid random search of non-existent network(s).

Figure 4:
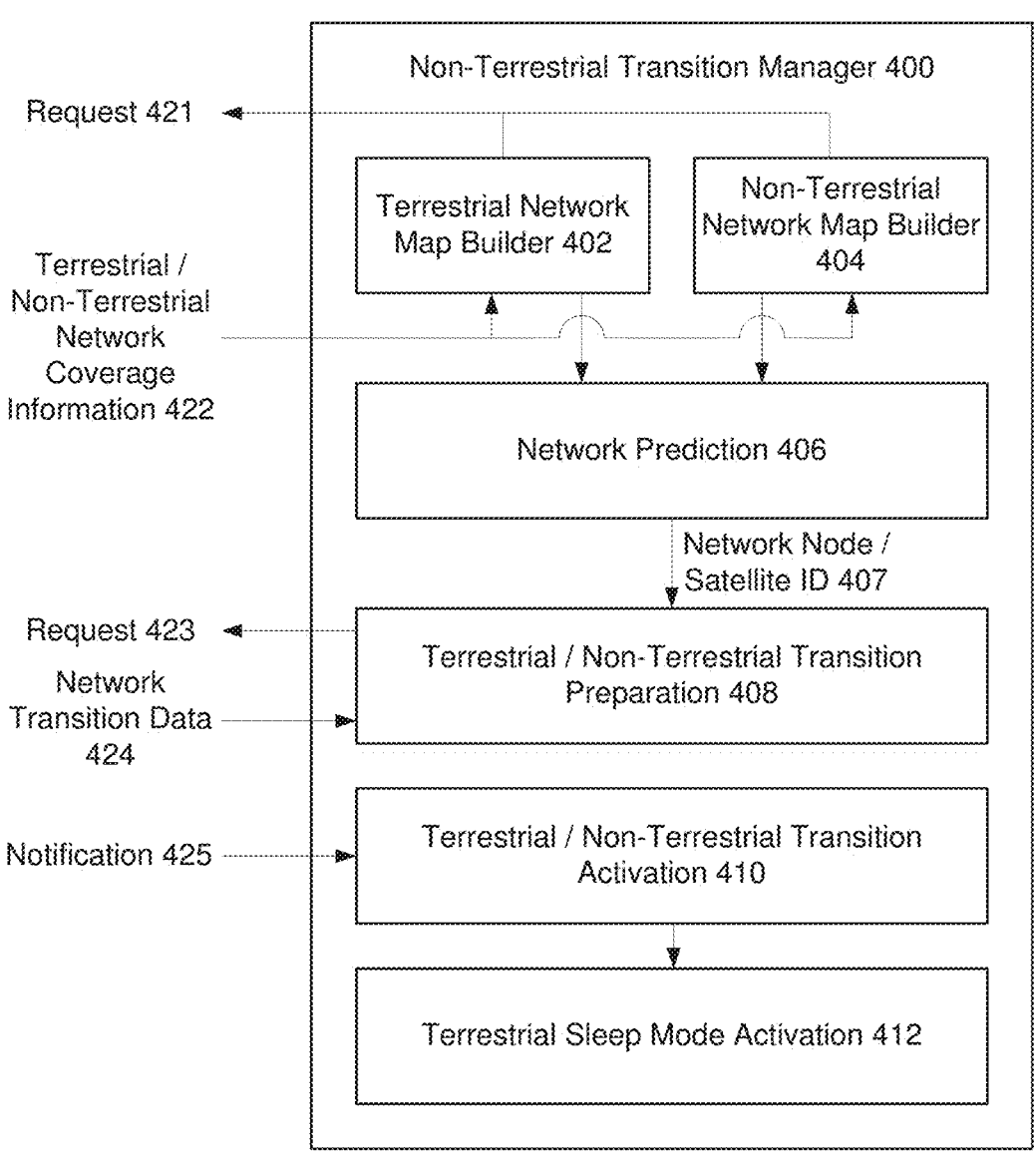
FIG. 4 illustrates an example non-terrestrial transition manager, in accordance with various aspects and embodiments of the subject disclosure.

FIG. 4 illustrates an example non-terrestrial transition manager, in accordance with various aspects and embodiments of the subject disclosure. The example non-terrestrial transition manager 400 can implement, e.g., the non-terrestrial transition manager 314 illustrated in FIG. 3. The non-terrestrial transition manager 400 includes a terrestrial network map builder 402, a non-terrestrial network map builder 404, network prediction 406, terrestrial/non-terrestrial transition preparation 408, terrestrial/non-terrestrial transition activation 410, and terrestrial sleep mode activation 412.

Example operations of the non-terrestrial transition manager 400 can include, e.g., sending a request 421 for terrestrial/non-terrestrial network coverage information, and receiving the terrestrial/non-terrestrial network coverage information 422 in response to the request 421. The request 421 can be sent via a terrestrial network when the UE 300 is connected to a terrestrial network, and the request 421 can be sent via a non-terrestrial network when the UE 300 is connected to a non-terrestrial network. The received terrestrial/non-terrestrial network coverage information 422 can comprise, e.g., the terrestrial/non-terrestrial network coverage information 211 or 213, illustrated in FIG. 2. The terrestrial network map builder 402 can construct a map of nearby terrestrial network coverage using the terrestrial/non-terrestrial network coverage information 422, and the non-terrestrial network map builder 404 can construct a map of nearby non-terrestrial network coverage using the terrestrial/non-terrestrial network coverage information 422.

Network prediction 406 can use map information generated by the terrestrial network map builder 402 and the non-terrestrial network map builder 404, along with UE 300 location and trajectory information, to make predictions regarding which terrestrial or non-terrestrial network nodes/satellites the UE 300 may connect to in the future, and optionally delay times that predict when the UE 300 will connect to a next node. Network prediction 406 can supply network node/satellite ID 407 to the terrestrial/non-terrestrial transition preparation 408.

Terrestrial/non-terrestrial transition preparation 408 can send a request 423 for network transition data 424, and the terrestrial/non-terrestrial transition preparation 408 can receive network transition data 424 in response to the request 423. The network transition data 424 can comprise, e.g., network transition data 212 or 214, illustrated in FIG. 2. Terrestrial/non-terrestrial transition preparation 408 can be configured to store the network transition data 424 and/or preconfigure UE 300 radios to use the network transition data 424, in order to prepare the UE 300 for transitions to a next terrestrial or non-terrestrial network connection.

Terrestrial/non-terrestrial transition activation 410 can be configured to activate a new connection to a terrestrial or non-terrestrial network in response to an event, such as the UE 300 leaving a terrestrial network service area 221A, or the UE 300 entering a terrestrial network service area 221B, or the UE determining a terrestrial network connection is sufficiently strong to warrant disconnecting from a non-terrestrial network. Terrestrial/non-terrestrial transition activation 410 can activate connections according to network transition data 424 stored/preconfigured by the terrestrial/non-terrestrial transition preparation 408.

Terrestrial sleep mode activation 412 can be configured to activate a terrestrial sleep mode and/or operation of a terrestrial sleep manager 316, after the UE 300 connects to a non-terrestrial network. An example terrestrial sleep manager is described further in connection with FIG. 5.

Figure 5:
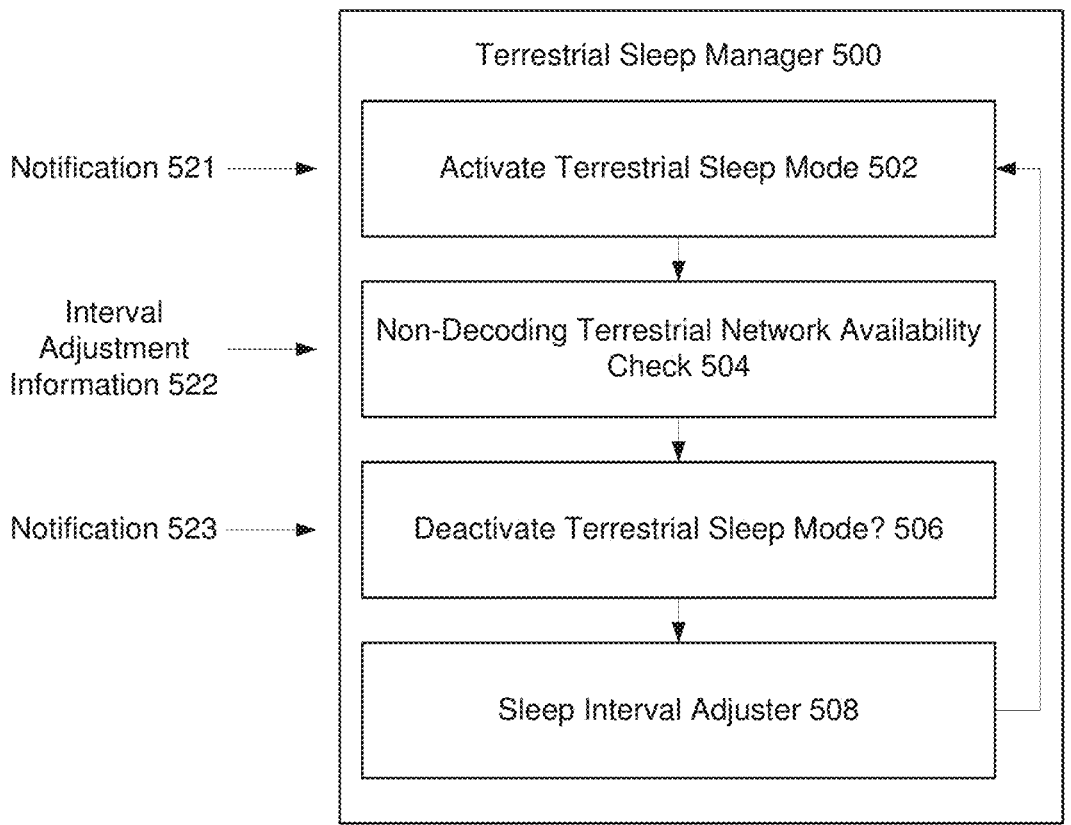
FIG. 5 illustrates an example terrestrial sleep manager, in accordance with various aspects and embodiments of the subject disclosure.

FIG. 5 illustrates an example terrestrial sleep manager, in accordance with various aspects and embodiments of the subject disclosure. The example terrestrial sleep manager 500 can implement, e.g., the terrestrial sleep manager 316 illustrated in FIG. 3. The terrestrial sleep manager 500 includes activate terrestrial sleep mode 502, non-decoding terrestrial network availability check 504, deactivate terrestrial sleep mode? 506, and sleep interval adjuster 508.

Example operations of the terrestrial sleep manager 500 can include receiving a notification 521. The notification 521 can notify terrestrial sleep manager 500 that the UE 300 has connected to a non-terrestrial network. In some embodiments, the notification can be generated by terrestrial sleep mode activation 412, illustrated in FIG. 4.

In response to the notification 521, the terrestrial sleep manager 500 can activate terrestrial sleep mode 502. Activating terrestrial sleep mode can be operable to deactivate terrestrial network radios, e.g., cellular and Wi-Fi radios at UE 300, and can initiate a timer to measure a time interval during which the terrestrial network radios remain deactivated. The timer can be used to implement extended time intervals. The term "extended time interval" as used herein refers to time intervals used when the UE 300 is connected to a non-terrestrial network, and which are longer than similar time intervals used when the UE 300 is not connected to any network. When the terrestrial sleep manager 500 deactivates terrestrial network radios for extended time intervals, the terrestrial sleep manager 500 can prevent the UE 300 from performing terrestrial network availability checks during the extended time intervals. By preventing the UE 300 from performing terrestrial network availability checks, the terrestrial sleep manager 500 can save UE 300 battery life and processing resources while the UE 300 is connected to the non-terrestrial network.

After an extended time interval has elapsed, the terrestrial sleep manager 500 can allow the UE 300 to perform one or more terrestrial network availability checks. After the one or more terrestrial network availability checks, the terrestrial sleep manager 500 can again activate terrestrial sleep mode 502, thereby initiating another extended time interval during which the UE 300 does not perform terrestrial network availability checks.

In some embodiments, the terrestrial network availability checks performed between extended time intervals can comprise non-decoding terrestrial network availability checks managed by non-decoding terrestrial network availability check 504. The non-decoding terrestrial network availability checks can be streamlined checks which check for existence of one or more waveforms associated with terrestrial networks, without decoding the waveforms. If terrestrial network waveforms are detected, the terrestrial sleep manager 500 can cause the UE 300 to exit the terrestrial sleep mode. If terrestrial network waveforms are not detected, the terrestrial sleep manager 500 can maintain the terrestrial sleep mode.

The terrestrial sleep manager 500 can comprise deactivate terrestrial sleep mode? 506, which can cause the UE 300 to exit the terrestrial sleep mode. Deactivate terrestrial sleep mode? 506 can be configured to respond to various different conditions. For example, detection of a terrestrial network during a terrestrial network availability check can cause the terrestrial sleep manager 500 to exit terrestrial sleep mode. Receiving a notification 523, e.g., a notification 215 from a satellite 203 such as illustrated in FIG. 2, can also optionally cause the terrestrial sleep manager 500 to exit terrestrial sleep mode. Other circumstances, such as detecting a location of UE 300 is within a terrestrial service area 221B, can also cause the terrestrial sleep manager 500 to exit terrestrial sleep mode.

The terrestrial sleep manager 500 can further comprise sleep interval adjuster 508. The sleep interval adjuster 508 can optionally adjust the length of the extended time interval (s) applied by the terrestrial sleep manager 500. In some embodiments, the sleep interval adjuster 508 can be configured to apply interval adjustment information 522 received by the terrestrial sleep manager 500. The interval adjustment information 522 can comprise, e.g., information received via satellite 203. The satellite 203 can be configured to calculate extended time intervals for application at the UE 300 based on UE 300 location and trajectory, and distance to surrounding terrestrial network nodes. In some embodiments, the sleep interval adjuster 508 can be configured to implement different sleep levels, e.g., a second sleep level which has a longer extended time interval than a first extended time interval. The second and any subsequent sleep levels can be applied in series after terrestrial network availability checks.

Figure 6:
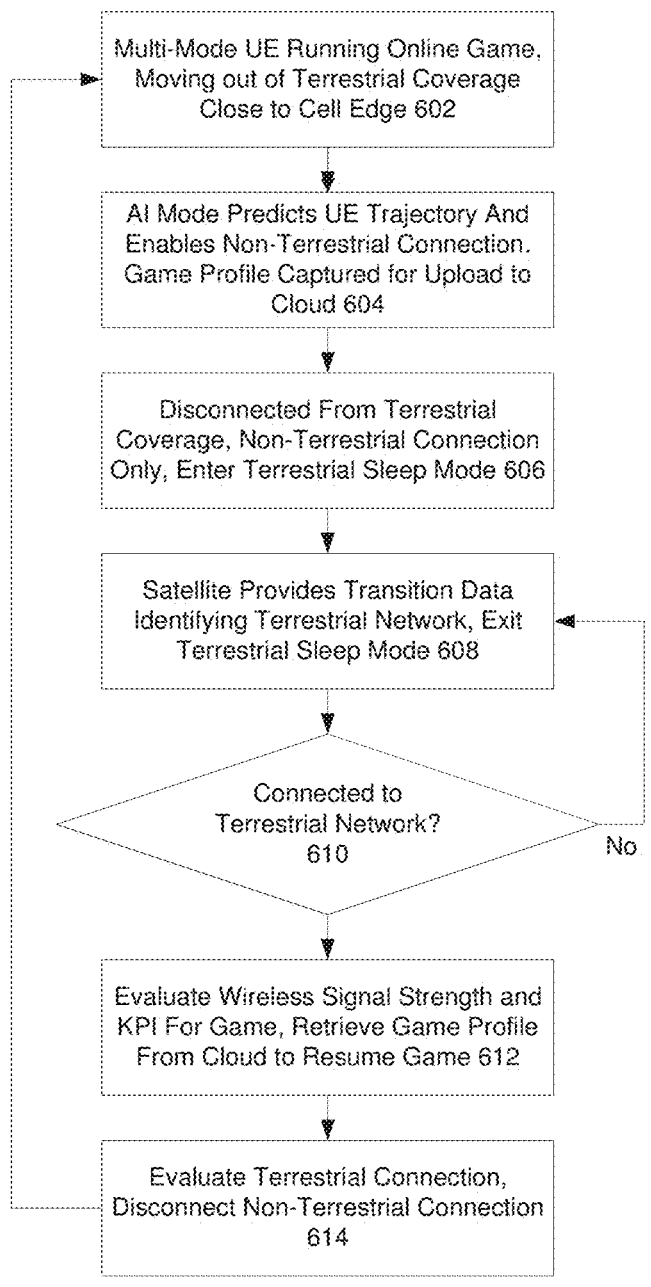
FIG. 6 illustrates example operations that can be performed by a UE configured in accordance with various aspects and embodiments of the subject disclosure.

FIG. 6 illustrates example operations that can be performed by a UE configured in accordance with various aspects and embodiments of the subject disclosure. In operations according to FIG. 6, at 602, a multi-mode UE, e.g., UE 202 in FIG. 2, may be running an online game and moving out of terrestrial coverage and close to a cell edge. For example, the UE 202 may be close to an edge of the service area 221A illustrated in FIG. 2. At 604, an AI mode predicts the UE's 202 trajectory and enables a non-terrestrial connection, e.g., a connection to satellite 203. A game profile is captured and can be uploaded to the cloud.

At 606, the UE 202 becomes disconnected from terrestrial coverage and is therefore connected via a non-terrestrial connection to satellite 203 only. The UE 202 can enter a terrestrial sleep mode as described herein.

At 608, the satellite 203 provides the UE 202 with network transition data 214 that identifies a terrestrial network, e.g., information associated with the network node 201B. The UE 202 can exit terrestrial sleep mode allowing the UE 202 to find and connect to the network node 201B when the UE 202 enters service area 221B. At 610, if the UE 202 successfully connects to the terrestrial network, the UE 202 can proceed to operation 612. If not, the UE 202 can return to 608.

At 612, the UE 202 can evaluate wireless signal strength and key performance indicators (KPIs) of the terrestrial network. If the signal strength and KPIs are adequate to support game play, then the UE 202 can retrieve the game profile from the cloud and resume the game. At 614, the UE 202 can evaluate its terrestrial connection (signal strength and KPIs) and if the connection satisfies threshold values, then the UE 202 can disconnect the non-terrestrial connection to the satellite 203.

FIGS. 7A and 7B provide a flow diagram representing example operations to manage non-terrestrial network transitions, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIGS. 7A and 7B can be performed, for example, by a device such as UE 202, illustrated in FIG. 2. Example operation 702 comprises performing, by a device 202, a search for available network communication services. Operation 704 comprises, based on search results resulting from the performing of the search at 702, identifying, by the device 202, terrestrial network information applicable to obtain terrestrial network coverage information, e.g., information regarding network node 201A and its service area 221A. Operation 706 comprises, based on search results resulting from the performing of the search at 702, identifying, by the device 202, non-terrestrial network information applicable to obtain non-terrestrial network coverage information, e.g., information regarding satellite 203 and its service area 223.

Operation 708 comprises obtaining, by the device 202, the terrestrial network coverage information 211 comprising a first representation of a first geographic area, e.g., the geographic area of service area 221A, wherein a terrestrial network has been predicted to be available to provide terrestrial network communication service when the device 202 is located within the first geographic area. Operation 710 comprises obtaining, by the device 202, the non-terrestrial network coverage information 211 comprising a second representation of a second geographic area, e.g., the geographic area of service area 223, wherein a non-terrestrial network has been predicted to be available to provide non-terrestrial network communication service when the device 202 is located within the second geographic area.

Operation 712 comprises predicting, by the device 202, while the device 202 is connected to the terrestrial network communication service, a movement out of the first geographic area 221A by the device 202. Operation 714 comprises predicting, by the device 202, while the device 202 is connected to the terrestrial network communication service, a probability that the device 202 will be in the second geographic area 223 after the movement out of the first geographic area 221A.

Operation 716 comprises, in response to predicting the probability that the device 202 will be in the second geographic area 223 after the movement out of the first geographic area 221A, preparing, by the device 202, while the device 202 is connected to the terrestrial network communication service, non-terrestrial network data, e.g., transition data 212, to enable the non-terrestrial network communication service to be provided to the device 202 after the movement out of the first geographic area 221A.

Operation 718 comprises activating, by the device 203, the non-terrestrial network communication service (via satellite 203) in response to the device 202 becoming disconnected from the terrestrial network communication service (via network node 201A).

Operation 720 comprises, subsequent to activating the non-terrestrial network communication service, initiating, by the device 202, a terrestrial sleep mode of the device 202. The terrestrial sleep mode can comprise an extended time interval between terrestrial network communication service availability checks, wherein the extended time interval is longer than a time interval used between the terrestrial network communication service availability checks while the device 202 is not in the terrestrial sleep mode. Operation 722 comprises adjusting, by the device 202, a length of a terrestrial sleep mode extended time interval based on at least one of a location of the device 202 or a motion of the device 202.

In some embodiments, terrestrial sleep mode can comprise a non-decoding availability check to check availability of the terrestrial network communication service. The non-decoding availability check comprises checking for an existence of a waveform without decoding the waveform. In some embodiments, the terrestrial sleep mode can comprise different sleep levels activated via expirations of different time intervals, e.g., expiration of previous extended time intervals applied by the terrestrial sleep manager.

Operation 724 comprises receiving, by the device 202, an exit instruction such as notification 215 via the non-terrestrial network communication service, and exiting, by the device 202, the terrestrial sleep mode in response to the exit instruction.

Operation 726 comprises identifying, by the device 202, a terrestrial node 201B of the terrestrial network communication service for use by the device 202 subsequent to a disconnection of the device 202 from the non-terrestrial network communication service provided by satellite 203.

FIG. 8 is a flow diagram representing example operations to manage a terrestrial network sleep mode, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

In some embodiments, the operations illustrated in FIG. 8 can be performed, for example, by UE 202, illustrated in FIG. 2. Example operation 802 comprises switching from a terrestrial network communication service to a non-terrestrial network communication service. The terrestrial network communication service can comprise service via network nodes 201A, 201B, 201C positioned on an Earth surface, and the non-terrestrial network communication service can comprise service via a satellite 203 above the Earth surface.

Example operation 804 comprises, in response to switching to the non-terrestrial network communication service, initiating a terrestrial sleep mode comprising an extended time interval between terrestrial network communication service availability checks, wherein the extended time interval is longer than a time interval used between the terrestrial network communication service availability checks while the UE 202 is not in the terrestrial sleep mode.

Example operation 806 comprises adjusting a length of the extended time interval based on interval adjustment information received via the non-terrestrial network communication service. For example, interval adjustment information can be provided by the satellite 203. Example operation 808 comprises receiving a push notification 215 via the non-terrestrial network communication service and exiting the terrestrial sleep mode in response to receiving the push notification 215. The UE 202 can also optionally exit the terrestrial sleep mode due to expiration of an extended time interval, as described below.

Example operation 810 comprises performing a first terrestrial network communication service availability check. The first terrestrial network communication service availability check, as well as any further terrestrial network communication service availability checks, can comprise a non-decoding availability check adapted to check for a waveform without decoding the waveform.

Example operation 812 comprises, in response to the first terrestrial network communication service availability check not identifying an available terrestrial node (e.g., node 201B) of the terrestrial network communication service, maintaining a connection to the non-terrestrial network communication service.

At operation 814, when the extended time interval elapses, the process can proceed to operation 816. Example operation 816 comprises performing a second terrestrial network communication service availability check according to the extended time interval. As noted above, the terrestrial network communication service availability check can comprise a non-decoding availability check adapted to check for a waveform without decoding the waveform. Example operation 818 comprises, in response to the second terrestrial network communication service availability check identifying an available terrestrial node 221B of the terrestrial network communication service, switching from the non-terrestrial network communication service to the terrestrial network communication service.

FIG. 9 is a flow diagram representing further example operations to manage a terrestrial network sleep mode, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 9 can be performed, for example, by user equipment, e.g., UE 202, illustrated in FIG. 2. Example operation 902 comprises switching from a terrestrial wireless communication service to a non-terrestrial wireless communication service, e.g., to a service provided via satellite 203. Example operation 904 comprises, in response to switching to the non-terrestrial wireless communication service, initiating a terrestrial sleep mode comprising an extended time interval between terrestrial wireless communication service availability checks, wherein the extended time interval is longer than a time interval used between the terrestrial wireless communication service availability checks in a different mode other than the terrestrial sleep mode.

Example operation 906 comprises receiving an exit instruction, e.g., notification 215, via the non-terrestrial wireless communication service. The exit instruction can optionally comprise terrestrial node identification information that identifies a terrestrial node 221B of the terrestrial wireless communication service. Example operation 908 comprises exiting the terrestrial sleep mode in response to the exit instruction 215.

Example operation 910 comprises, in response to exiting the terrestrial sleep mode, searching for available terrestrial nodes 221B, 221C of the terrestrial wireless communication service. In embodiments wherein terrestrial node 221B was previously identified, e.g., via notification 215, the UE 202 can optionally omit operation 910.

Example operation 912 comprises switching from the non-terrestrial wireless communication service to the terrestrial wireless communication service subsequent to exiting the terrestrial sleep mode. The terrestrial wireless communication service can comprise, e.g., service via the identified terrestrial node 221B of the terrestrial wireless communication service.

Figure 10:
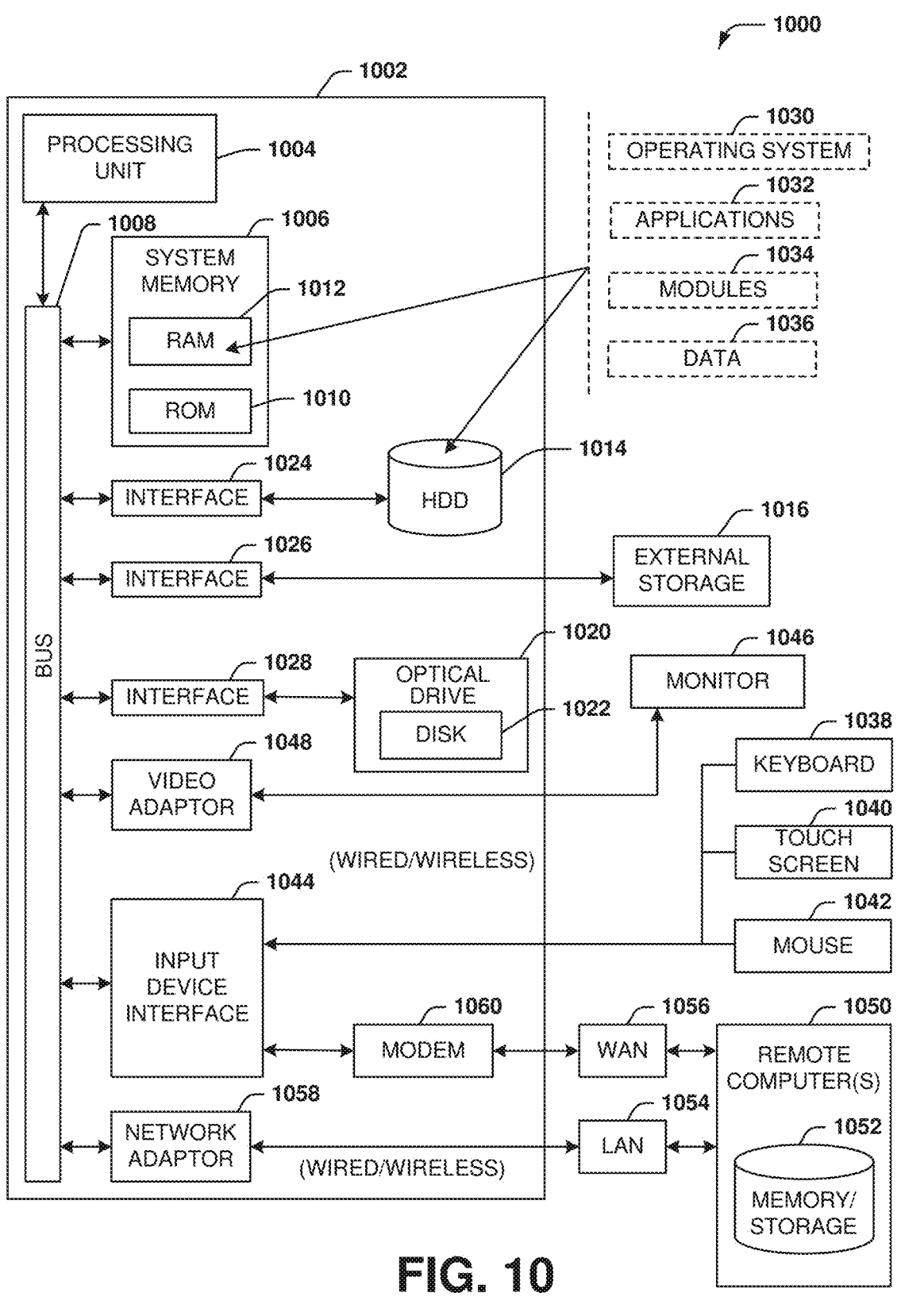
FIG. 10 is a block diagram of an example computer that can be operable to execute processes and methods in accordance with various aspects and embodiments of the subject disclosure.

FIG. 10 is a block diagram of an example computer that can be operable to execute processes and methods in accordance with various aspects and embodiments of the subject disclosure. The example computer can be adapted to implement, for example, any of the various equipment described herein.

FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), smart card, flash memory (e.g., card, stick, key drive) or other memory technology, compact disk (CD), compact disk read only memory (CD-ROM), digital versatile disk (DVD), Blu-ray™ disc (BD) or other optical disk storage, floppy disk storage, hard disk storage, magnetic cassettes, magnetic strip(s), magnetic tape, magnetic disk storage or other magnetic storage devices, solid state drives or other solid state storage devices, a virtual device that emulates a storage device (e.g., any storage device listed herein), or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

obtaining, by a device comprising a processor, terrestrial network coverage information comprising a first representation of a first geographic area, wherein a terrestrial network has been predicted to be available to provide terrestrial network communication service when the device is located within the first geographic area;

obtaining, by the device, non-terrestrial network coverage information comprising a second representation of a second geographic area, wherein a non-terrestrial network has been predicted to be available to provide non-terrestrial network communication service when the device is located within the second geographic area;

predicting, by the device, while the device is connected to the terrestrial network communication service, a movement out of the first geographic area by the device;

predicting, by the device, while the device is connected to the terrestrial network communication service, a probability that the device will be in the second geographic area after the movement out of the first geographic area;

in response to predicting the probability that the device will be in the second geographic area after the movement out of the first geographic area, preparing, by the device, while the device is connected to the terrestrial network communication service, non-terrestrial network data to enable the non-terrestrial network communication service to be provided to the device after the movement out of the first geographic area;

activating, by the device, the non-terrestrial network communication service in response to the device becoming disconnected from the terrestrial network communication service; and subsequent to the activating the non-terrestrial network communication service, initiating, by the device, a terrestrial sleep mode of the device, wherein the terrestrial sleep mode comprises a non-decoding availability check to check availability of the terrestrial network communication service, and wherein the non-decoding availability check comprises checking for an existence of a waveform without decoding the waveform.

2. The method of claim 1, further comprising performing, by the device, a search for available network communication services, and, based on search results resulting from the performing of the search, identifying, by the device, terrestrial network information applicable to obtain the terrestrial network coverage information and identifying, by the device, non-terrestrial network information applicable to obtain the non-terrestrial network coverage information.

3. The method of claim 1, wherein the terrestrial network communication service comprises service via network nodes positioned on an Earth surface, and wherein the non-terrestrial network communication service comprises service via a satellite above the Earth surface.

4. The method of claim 3, wherein checking availability of the terrestrial network communication service is a second terrestrial network communication service availability check, and wherein the method further comprise:

performing a first terrestrial network communication service availability check; and in response to the first terrestrial network communication service availability check not identifying an available terrestrial node of the terrestrial network communication service, maintaining a connection to the non-terrestrial network communication service.

5. The method of claim 1, wherein the terrestrial sleep mode comprises an extended time interval between terrestrial network communication service availability checks, and wherein the extended time interval is longer than a time interval used between the terrestrial network communication service availability checks while the device is not in the terrestrial sleep mode.

6. The method of claim 5, further comprising adjusting, by the device, a length of the extended time interval based on at least one of a location of the device, or a motion of the device.

7. The method of claim 5, further comprising adjusting, by the device, a length of the extended time interval based on interval adjustment information received via the non-terrestrial network communication service.

8. The method of claim 1, wherein the terrestrial sleep mode comprises different sleep levels activated via expirations of different time intervals.

9. The method of claim 1, further comprising receiving, by the device, an exit instruction via the non-terrestrial network communication service, and exiting, by the device, the terrestrial sleep mode in response to the exit instruction.

10. The method of claim 1, further comprising identifying, by the device, a terrestrial node of the terrestrial network communication service for use by the device subsequent to a disconnection of the device from the non-terrestrial network communication service.

11. A user equipment, comprising:

a processor; and a memory that stores executable instructions that, when executed by the processor, facilitate performance of operations, comprising:

switching from a terrestrial network communication service to a non-terrestrial network communication service;

in response to switching to the non-terrestrial network communication service, initiating a terrestrial sleep mode comprising an extended time interval between terrestrial network communication service availability checks, wherein the extended time interval is longer than a time interval used between the terrestrial network communication service availability checks while the user equipment is not in the terrestrial sleep mode, and wherein the terrestrial network communication service availability checks comprise a non-decoding availability check adapted to check for a waveform without decoding the waveform;

performing a terrestrial network communication service availability check according to the extended time interval; and in response to the terrestrial network communication service availability check identifying an available terrestrial node of the terrestrial network communication service, switching from the non-terrestrial network communication service to the terrestrial network communication service.

12. The user equipment of claim 11, wherein the terrestrial network communication service comprises service via network nodes positioned on an Earth surface, and wherein the non-terrestrial network communication service comprises service via a satellite above the Earth surface.

13. The user equipment of claim 11, wherein the operations further comprise adjusting a length of the extended time interval based on interval adjustment information received via the non-terrestrial network communication service.

14. The user equipment of claim 11, wherein the operations further comprise:

activating the non-terrestrial network communication service in response to the user equipment becoming disconnected from the terrestrial network communication service; and subsequent to activating the non-terrestrial network communication service, the terrestrial sleep mode is initiated.

15. The user equipment of claim 11, wherein the operations further comprise receiving a push notification via the non-terrestrial network communication service and exiting the terrestrial sleep mode in response to receiving the push notification.

16. The user equipment of claim 11, wherein the terrestrial network communication service availability check is a second terrestrial network communication service availability check, and wherein the operations further comprise:

performing a first terrestrial network communication service availability check; and in response to the first terrestrial network communication service availability check not identifying the available terrestrial node of the terrestrial network communication service, maintaining a connection to the non-terrestrial network communication service.

17. A non-transitory machine-readable medium, comprising executable instructions that, when executed by a processor, facilitate performance of operations, comprising:

switching from a terrestrial wireless communication service to a non-terrestrial wireless communication service;

in response to switching to the non-terrestrial wireless communication service, initiating a terrestrial sleep mode comprising an extended time interval between terrestrial wireless communication service availability checks, wherein the extended time interval is longer than a time interval used between the terrestrial wireless communication service availability checks in a different mode other than the terrestrial sleep mode, and wherein the terrestrial wireless communication service availability checks comprise a non-decoding availability check adapted to check for a waveform without decoding the waveform;

receiving an exit instruction via the non-terrestrial wireless communication service; and exiting the terrestrial sleep mode in response to the exit instruction.

18. The non-transitory machine-readable medium of claim 17, wherein the exit instruction comprises terrestrial node identification information that identifies a terrestrial node of the terrestrial wireless communication service, and wherein the operations further comprise switching from the non-terrestrial wireless communication service to service via the terrestrial node of the terrestrial wireless communication service.

19. The non-transitory machine-readable medium of claim 17, wherein the operations further comprise switching from the non-terrestrial wireless communication service to the terrestrial wireless communication service subsequent to exiting the terrestrial sleep mode.

20. The non-transitory machine-readable medium of claim 17, wherein the operations further comprise, in response to exiting the terrestrial sleep mode, searching for available terrestrial nodes of the terrestrial wireless communication service.

* * * * *